J. S. DUNCAN.
COMBINED PRINTING AND IDENTIFICATION DEVICE.
APPLICATION FILED FEB. 2, 1917.
1,288,395.
Patented Dec. 17, 1918.
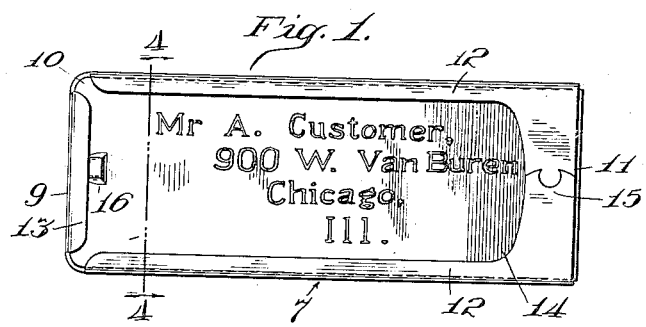
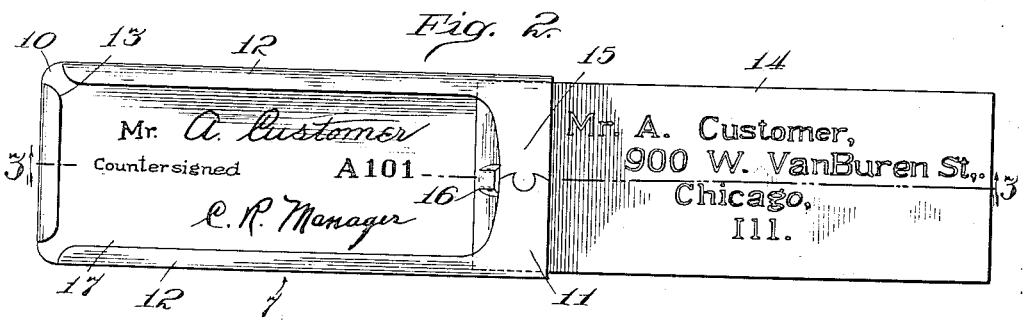
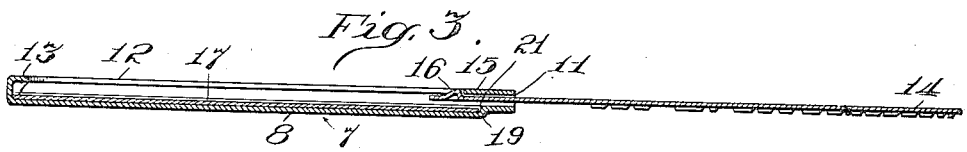
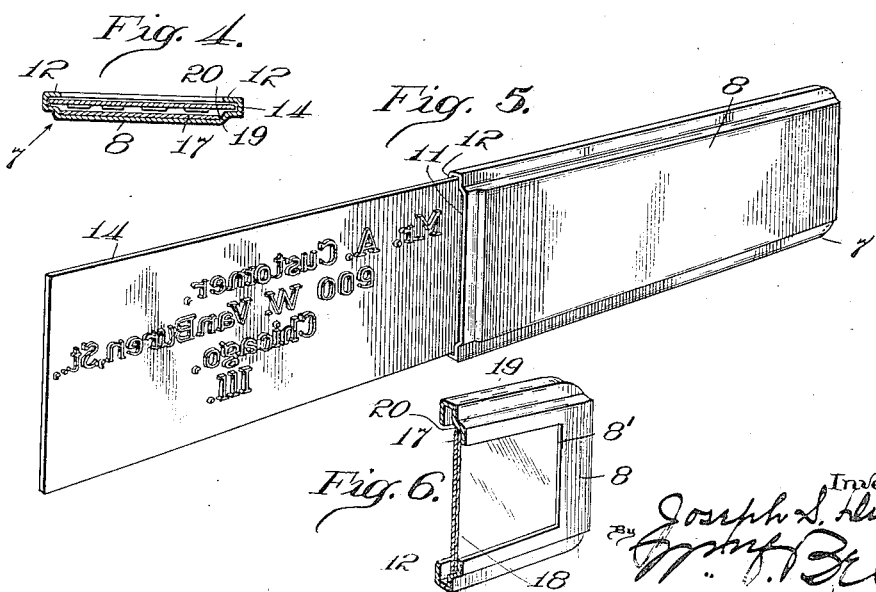

UNITED STATES PATENT OFFICE.

JOSEPH S. DUNCAN, OF CHICAGO, ILLINOIS, ASSIGNOR TO ADDRESSOGRAPH COMPANY, OF CHICAGO, ILLINOIS, A CORPORATION OF ILLINOIS.

COMBINED PRINTING AND IDENTIFICATION DEVICE.

1,288,395.     Specification of Letters Patent.     Patented Dec. 17, 1918.

Application filed February 2, 1917. Serial No. 146,063.

*To all whom it may concern:*

Be it known that I, JOSEPH S. DUNCAN, a citizen of the United States, residing at Chicago, in the county of Cook and State of Illinois, have invented certain new and useful Improvements in Combined Printing and Identification Devices, of which the following is a specification.

The object of this invention is to provide a combined printing and identification device, of small size and compact form which can be readily employed in a suitable machine for taking an impression therefrom and at the same time, or at other times, used for identification purposes.

When a customer makes a purchase in a department or other large store he usually gives his name and address across the counter to the salesperson who enters the same on a sales lip and also memoranda of the goods, price, etc. If the customer pays in cash this is the end of the transaction and the goods finally reach the delivery department of the store and are delivered to the customer's address. If the customer has an account with the store and the goods are to be charged the transaction is in some of various ways referred to or supervised by the credit department of the store before the goods are delivered, which to this extent increases the cost of making the sale.

It is a known fact that the cost of delivery of goods by large stores is greatly increased by mistakes in addresses, this being due to various causes, sometimes to the fact that the salesperson does not clearly understand the name and address when given by the customer, sometimes to poor writing and sometimes to mistakes in transcription to the delivery tags or slips. It is the practice in some stores for the salesperson to write the name and address upon a delivery tag before or after it is written on the sales slip and as the customer ordinarily does not inspect either the tag or the slip it sometimes happens that an incorrect entry is made on one or the other or both. In addition to the expense incurred by the store in delivering goods at the wrong address, and sometimes the loss of the goods, there is to be considered the failure to deliver the goods to the customer in proper time which sometimes results in refusal of the customer to receive the goods and sometimes in the loss of an account.

It is the object of my invention to provide a simple device which can be carried by the customer and exhibited for the purpose of identification and, if desired, to indicate a credit rating and which can also be employed as a printing device from which the salesperson can quickly take an impression directly upon the sales slip and also upon the delivery tag so that the salesperson can immediately determine whether or not credit should be extended to the customer, and to what extent, and whereby mistakes in addresses will be entirely eliminated.

A further object of the invention is to facilitate the sales transaction and to avoid the necessity of the customer disclosing his name and address to other customers who may be nearby and which information has sometimes been availed of to fraudulently obtain goods from a store.

With these and other ends in view the invention contemplates a printing device preferably in the form of a printing plate having printing characters stamped up in relief thereon to represent the customer's name and address and such other memoranda, as may be desired, said device being arranged within a convenient holder which protects the printing characters and also preferably contains a slip bearing the signature of the customer, countersigned by an officer of the store, and other memoranda, if desired, such as a card rating.

In the accompanying drawings—

Figure 1 is a plan view illustrating a preferred embodiment of my invention in which the printing device is slidably arranged in a protective holder;

Fig. 2 is a similar view showing the printing device in printing position;

Fig. 3 is a longitudinal sectional view on the line 3—3 of Fig. 2;

Fig. 4 is a transverse sectional view on the line 4—4 of Fig. 2;

Fig. 5 is a perspective view of the device showing the character side of the printing device; and Fig. 6 is a portion of the device in perspective showing an opening in the back of the holder.

Referring to the drawings, it will be noted that the invention comprises, in a preferred construction thereof, a holder and a printing device securely but detachably engaged with said holder and normally arranged therein with the printing characters protected and adapted to be moved out of the holder sufficiently to secure an impression therefrom, and with a card arranged in the holder if desired.

In the preferred form of the invention disclosed in Figs. 1 to 5 the holder 7 consists of a casing which is closed at the back 8 and at one end 9 and open at the front 10 and at its other end 11, but the back of the holder may be provided with an opening 8', as illustrated in Fig. 6. The holder may be made of any suitable material and it is provided at the front with top and bottom flanges 12, 12 and an end flange 13 which form guides for the printing plate 14 and retain the same in the holder. At the open end of the holder, on the front thereof, the flanges are extended until they meet and form a wall 15 which also serves as a guide for the printing device.

In this form of the invention the printing device preferably consists of a printing plate having type characters stamped up thereon and it is arranged within the holder with the faces of the type characters directed toward the back of the holder so that they will be protected from injury when the device is not in use. These printing characters appear in relief on the front of the printing device and in intaglio on the back of the printing device, and as the back is exposed to view when the printing device is inclosed within the holder, as shown in Fig. 1, the characters in intaglio will be legible as shown in said figure. I provide a stop 16 on the inner end of the printing device which is arranged to engage the wall 15 to prevent the device from sliding out of the holder, but the wall 15 may be sprung outward sufficiently to permit the stop to slide thereunder (or the stop may be depressed sufficiently to pass under the wall 15) for the purpose of changing the printing device.

Instead of employing a printing device as shown and just described with characters in relief thereon I may employ a printing device in which the characters are in stencil form.

A card 17 may be located within the holder against the back thereof so that it will be concealed by the printing device when the latter is within the holder. This card may be utilized for any desired purpose, for example, to bear on the side thereof opposite the printing device the signature of the customer countersigned by the credit manager for identification purposes and a credit rating indicated by letters, numerals or in any other way. In the construction of Fig. 6 the side of the card exposed through the opening 12 in the back of the holder may be used to bear the customer's name or for any useful information and may be protected by a transparent sheet 18 interposed between the card and the back of the holder. The back of the holder may be struck up to form a panel 19 on the outside and a recess 20 on the inside of the holder to accommodate the card so that the face of the type characters will not slide thereon when the printing device is slid in and out of the holder.

The device will be made of a suitable size and shape to be carried in a pocket or in a purse and its construction permits of it being made in comparatively small size and attractive in appearance. When used for shopping, as hereinbefore explained, the customer will arrange for a credit rating with the credit manager and write his name on the card and the manager will countersign the same, indicating, if desired, a credit rating to be extended to the customer in some manner thereon which will be understood by the sales force. At various locations throughout the store suitable machines will be provided to receive the printing devices and take impressions therefrom upon the sales slips and delivery tags with which the sales force is provided. When the customer makes a purchase he will present the device to the salesperson who will slide out the printing device and arrange the same in one of the machines and take as many impressions therefrom as may be required by the system employed in the store. If the salesperson has any doubt as to the identity of the customer she may require him to write his name and then compare the signature with his signature in the device.

It will be observed that the use of this device not only facilitates the transaction between the customer and the salesperson but it insures accuracy and secrecy since it will not be necessary for either the customer or the salesperson to mention the customer's name or address in the transaction. It eliminates the possibility of mistakes on the part of the salesperson in taking down the name and address of the customer and absolutely insures that the customer's name and address will in every instance be correctly recorded on the sales slip and the delivery tag so that the chances of mistake in delivery will be reduced to a minimum.

I am aware that changes in the form and proportion and construction of parts may be made without departing from the spirit or sacrificing the advantages of the invention and I reserve the right to make all such changes as fairly come within the spirit and scope of the accompanying claims. For example, I may substitute a photograph of the customer for the card or use it in connection with the card. The photograph may appear on the inner side of the card with the signature of the customer and other data or this or other information of any kind may be variously distributed on the card.

It will be apparent that the card may carry any information arranged thereon in any manner desired.

The printing device will hold the card in the holder and the card may extend from end to end of the holder so that it will project beneath the end flange and the end wall, but this length is not arbitrary and may be varied. I prefer to provide the recess to receive the card but this may be omitted if provision is made for the printing device to slide freely over the card. The face of the card may be protected from the type characters by interposing a sheet of transparent material. The recess preferably terminates at 21 back of the open end of the holder and when the card is seated in the recess it will allow the printing device to slide freely thereover and will not be drawn out by the printing device. The card may be secured in place by adhesive or it may be omitted entirely.

I have described the invention for use in the selling system of a store, as I have found that it will be of great utility in this connection, but I am aware that it has other uses which, however, need not be referred to herein. In addition to the name and address the printing device may bear additional information or some other entirely different information.

I claim:

1. In a device of the character described, the combination of a printing device, a protecting holder embracing the edges and permitting sliding movement of said printing device, and means for preventing separation of said printing device and holder while permitting relative movement in the plane thereof whereby said printing device may be withdrawn to obtain an impression therefrom.

2. In a device of the character described, the combination of a printing device having printing characters struck up from the body thereof, and a holder comprising a back and inwardly turned flanges embracing said printing device, one end of said holder being open to permit withdrawal of said printing device when an impression is to be taken therefrom.

3. In a device of the character described, the combination of a holder having a back, and a printing device within the holder with its type characters facing said back and movable endwise out of the holder to have an impression taken therefrom, said type characters being arranged in information conveying relation on said printing device.

4. In a device of the character described, the combination of a holder open at the front thereof, and a printing device slidably arranged within the holder and having type characters thereon in information conveying relation, said type characters being stamped in relief in printing arrangement on the inner face of said plate and appearing in intaglio on the back of said plate which is exposed through the open front of the holder.

5. In a device of the character described, the combination of a holder open at the front thereof, and an address printing device slidably arranged within the holder, said device having type characters for a name and address stamped in relief in printing arrangement on the inner face of said plate and appearing in intaglio on the back of said plate which is exposed through the open front of the holder, said holder having a recess, and a card in said recess opposite the inner face of said address printing device and bearing information relating to the address on said printing device.

JOSEPH S. DUNCAN.

Witnesses:
WM. O. BELT,
M. A. KIDDIE.